United States Patent [19]

Gyory et al.

[11] Patent Number: 4,793,383
[45] Date of Patent: Dec. 27, 1988

[54] HEAT INSULATING TUBE

[75] Inventors: Gyula Györy, Szolnok; Zoltán Flórián, Nagykanizsa, both of Hungary

[73] Assignees: Kőolajkutató Vállalat, Szolnok; Dunántuli Kőolajipari Gépgyár, Nagykanizsa, both of Hungary

[21] Appl. No.: 110,089

[22] Filed: Oct. 14, 1987

Related U.S. Application Data

[63] Continuation of Ser. No. 833,879, May 5, 1986, abandoned.

[51] Int. Cl.⁴ .......................... F16L 9/18; F16L 39/00
[52] U.S. Cl. ..................................... 138/114; 138/149; 285/47
[58] Field of Search .................... 138/112–114, 138/148, 149; 285/47, 53, 904

[56] References Cited

U.S. PATENT DOCUMENTS

| | | | |
|---|---|---|---|
| 3,574,357 | 4/1971 | Alexandra | 138/149 |
| 3,865,145 | 2/1975 | McKay et al. | 138/113 |
| 4,183,378 | 1/1980 | Decker | 138/149 |
| 4,332,401 | 6/1982 | Stephenson et al. | 138/149 |
| 4,340,245 | 7/1982 | Stalder | 138/149 |
| 4,415,184 | 11/1983 | Stephenson et al. | 138/149 |
| 4,477,106 | 10/1984 | Hutchison | 138/149 |
| 4,480,371 | 11/1984 | McStravick et al. | 138/149 |
| 4,531,552 | 7/1985 | Kim | 138/114 |
| 4,570,679 | 2/1986 | Schippl | 138/149 |

FOREIGN PATENT DOCUMENTS 3338465  5/1985  Fed. Rep. of Germany ...... 138/149

Primary Examiner—Werner H. Schroeder
Attorney, Agent, or Firm—Schweitzer & Cornman

[57] ABSTRACT

A heat insulating tube, primarily for underground mining, is provided with an outer casing and an inner casing, separated from the other casing by a connecting element and a series of spacer rings. The distance between the connecting element and the spacer rings as well as between the spacer rings themselves is in the range of about 20 to 50 times the diameter of the inside casing.

6 Claims, 1 Drawing Sheet

U.S. Patent   Dec. 27, 1988   4,793,383

HEAT INSULATING TUBE

This is a file wrapper continuation of application Ser. No. 833,879 filed May 5, 1986, now abandoned.

The present invention concerns the heat insulating tube, primarily for mining purposes.

In the course of exploiting the materials to be mined through a pipeline the thermal equilibrium between the environment and the material transported through the pipeline meets great difficulties, the cooling of the transported material being a particular problem.

In the thermal water wells the cooling of the thermal water during the reaching up the surface reduces considerably the quantity of the heat energy to be utilized and it enhances the scale and salt deposition.

The different hydrocarbons and especially the cooling from the layer temperature in the course of petroleum production can bring about the precipitation of paraffin in wells. For that reason it is necessary to ameliorate the wells.

During the secondary petroleum production to be performed by vapour injection the cooling of vapour reduces the quantity of the heat energy to be utilized.

The aforesaid problems can be solved reasonably by the heat insulation of the production tubes introduced in the wells. A pressure exert its effect on the production tubes both from outside and inside. The value of this pressure increases with the depth.

In such a case the porous insulating materials cannot be used since the pores fill up with heat conducting liquid, on the other hand, the solid or plastic insulating materials improve the heat conduction resistance of the tube only insignificantly.

Different attempts are known for the heat insulation of tubes. However, one part of them has the unfavorable property of that the Q-value of the heat insulation is not satisfactory while their other part has a very complicated construction and therefore the production costs are very high.

SUMMARY OF THE INVENTION

The present invention purports to eliminate the aforesaid unfavorable characteristics by means of producing well tubes having a high-quality heat insulation and a simple construction simultaneously.

The present invention purports to produce a tube having a simple construction and a low heat conduction.

By virtue of the present invention the aforesaid task can be solved by applying a pipe having an outside and an inside casing. The outside casing is jointed to the inside casing by means of a connecting element installed at the pipe end, conveniently by means of a connecting disk or by means of a cross-connecting bridge. Further spacer rings are disposed around the inside casing at a given distance from the connecting element and each from other. The distance of the spacer rings is equal to the outer diameter of the inside casing multiplied by 20 to 50. It is chosen in such a way that the slenderness ratio of the sections of the inside casing between the spacer rings varies in the range of 30 to 70.

In this connection the slenderness ratio is a well known term of art to those or ordinary skill. It refers to the ratio of the length of a column L section to the radius of gyration r about the principal axes of the section or, in the case of a pipe, the ratio of the length of the pipe to the radius of the pipe. See, for example, the definition of the term in McGraw-Hill's Dictionary of Scientific and Technical Terms, Second Edition, 1978, p. 1473.

In one of the advantageous constructive solutions of the heat-insulating tube conforming to the present invention a valve body and/or a plug is disposed in the connecting element.

In an other advantageous constructive solution of the heat-insulating tube conforming to the present invention the connecting element is constituted by a cross-connecting bridge having outside and inside grooves.

In an further advantageous constructive solution of the heat-insulating tube conforming to the present invention a layered insulation is disposed between the outside casing and the inside casing.

In an further advantageous constructive solution of the heat insulating tube conforming to the present invention the interstice between the outside casing and the inside casing is filled up by an inert gas.

The construction and the function of the heat insulating tube conforming to the present invention are described in detail by means of the example of the execution represented in the enclosed drawings.

DETAILED DESCRIPTION OF THE DRAWINGS

Figure 1:
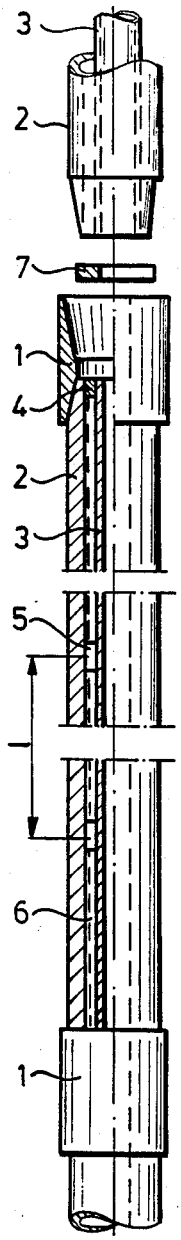
FIG. 1 represents the partial section of the concretized version of the heat insulating tube conforming to the present invention, characterized by the adaptation of a connecting disk.

The version represented in FIG. 1 includes the sleeve 1, the outside casing 2, the inside casing 3, the connecting disk 4, the spacer rings 5, the layered insulation 6 and the elastic ring 7.

Figure 2:
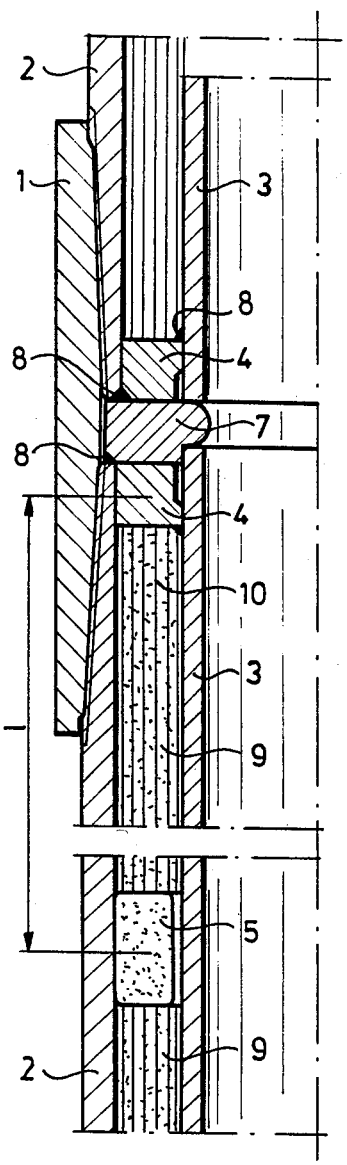
FIG. 2 represents the magnified section of the one detail of the version of the heat insulating tube represented in FIG. 1.

The FIG. 2 shows that the outside casing 2 and the inside casing 3 are jointed to the connecting disk 4 expediently by thermal junction, by welding or by brazing. The sleeve 1 is bolted to the threads of the outside casings 2. The layered insulation 6 consists of the heat insulator 9 and of the aluminium foil 10. The spacer rings 5 made of a reasonably heat resistant porous material are located at the distance 1 each from other and from the connecting disk 4. The spacer rings 5 located at the distance 1 are made reasonably of hard, porous, heat resistant material.

The distance 1 is chosen so that the slenderness ratio of the formed pipe sections varies in the range of 30 to 70 and the distance 1 be equal to the outer diameter of the inside casing 3 multiplied by 20 to 50.

Between the spacer rings 5 and the inside casing 3 the fit clearance 17 can be found for taking up the transversal dilatation of the inside casing 3.

In the sleeve 1 the elastic ring 7 is disposed for securing the gasket and the heat insulation.

Figure 3:
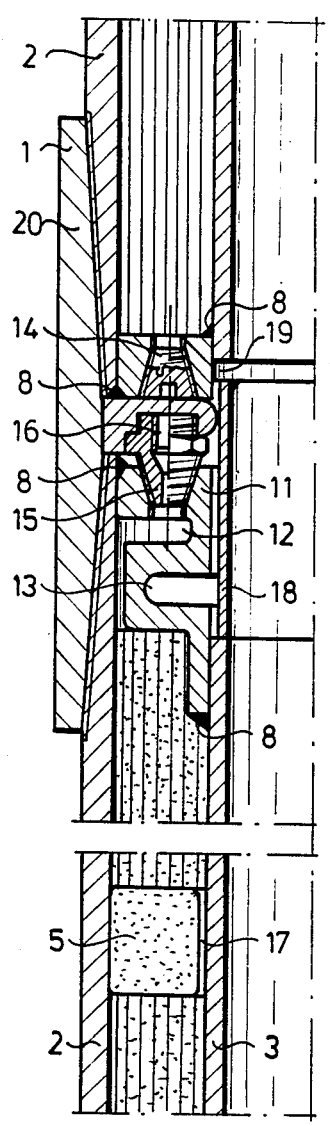
FIG. 3 represents the partial section of the concretized version of the heat insulating tube conforming to the present invention, characterized by the adaptation of a cross-connecting bridge.

In the version represented in FIG. 3 the inside casing 3 and the outside casing 2 are connected together by means of the cross-connecting bridge 11. The cross-connecting bridge 11 comprises the circular outside groove 12 and the circular inside groove 13. The cross-connecting bridge 11 is attached to the inside casing 3 and to the outside casing 2 by the thermal junction 8. The cross-connecting bridge 11 carries the valve body 15 having the locking bolt 16. As the continuation of the inside casing 3 the spacer sleeve 18 is placed in the region of the cross-connecting bridge 11. The spacer sleeve 18 is separated from the juxtaposed inside casing 3 by the longitudinaly interstice 19.

The connecting disk 4 represented similarly carries the plug 14.

In the course of using the heat insulation tube conforming to the present invention, operatively a considerable temperature difference arises between the inside casing 3 and the outside casing 2. This temperature difference causes the dilatation of the inside casing 3 to a greater extent. As a consequence the inside casing 3 is susceptible to bulging. However, the spacer rings 5 warrant the central position of the inside casing 3 in the operating temperature range in the conditions of a considerable compressive stress.

In the solution represented in FIG. 3 the residual deformation of the cross-connecting bridge 11 is not excluded during the first stress. On the other hand, the inside casing 3 is exposed to a constant tensile stress during the cooling. Since in the course of the subsequent warming up the loading of the inside casing is suppressed at first and hereupon the compressive stress begins to exert its effect, this solution permits to double the operating temperature range for a given material quality and for the geometrical dimensions.

The aluminium foil 10 disposed in the interstices of the heat insulation 9 reduces the losses caused by the heat radiation and the eventual streaming heat compensation.

The plug 14 serves for the ventilation of the interstice between the casings. The valve body 15 and the locking bolt 16 are suitable for connecting the interstice between the casings to a conduit, to a tank or to a pressure gauge. Consequently it is possible to perform the vacuuming, to fill up by indifferent gases characterized by the bad heat conduction or to control the filling-up of the space periodically.

The filling up of the inner space constituted by the outside casing 2 and by the inside casing 3, with inert gases improves the pressure conditions by means of compensating the outer pressure exerting its effect on the outside casing 2 as well as the inner pressure exerting its effect on the inside casing 3. Thereby the stress of material can be reduced in a given case. However it has the disadvantage of deteriorating the heat resistance.

Argon, krypton and helium can be applied reasonably for improving the heat insulation conditions.

The heat insulating tube conforming to the present invention has the advantage of that it is possible to make it of generally used materials at low expenses. At the same time it has a high heat insulation capacity.

We claim:

1. A heat insulating tube comprising:
   (a) an outer casing having a first end;
   (b) an inner casing concentric with and housed within said outer casing;
   (c) a cross connecting bridge extending between said inner casing and said outer casing and joining at said first end said outer and said inner casings to each other;
   (d) said cross connecting bridge having a circular outer groove extending towards said outer casing, and a circular inner groove extending toward said inner casing, said outer and inner groove being overlapped when viewed along the length of said tube;
   (e) a plurality of heat resistant spacer rings thermally separating said inner casing from said outer casing, said spacer rings being located from said connecting bridge and from one another by a distance which is the outer diameter of the inside casing multiplied by a number from 20–50; and
   (f) the slenderness ratio of said tube is between about 30 and about 70.

2. The heat insulating tube of claim 1, further comprising a valve body and a plug disposed adjacent to said cross connecting bridge.

3. The heat insulating tube of claim 1, further comprising layered insulation between said inner casing and said outer casing.

4. The heat insulating tube of claim 3, wherein said layered insulation includes an aluminum foil.

5. The heat insulating tube of claim 1, having a space defined between said outer casing and said inner casing, said space being filled with inert gas.

6. The heat insulating tube of claim 6, wherein said inert gas is one of argon, krypton, and helium.

* * * * *